(12) United States Patent
Smeeton et al.

(10) Patent No.: US 12,111,466 B2
(45) Date of Patent: Oct. 8, 2024

(54) DISPLAY SYSTEM AND LIGHT CONTROL FILM THEREFOR

(71) Applicant: ENVISICS LTD, Milton Keynes (GB)

(72) Inventors: Timothy Smeeton, Milton Keynes (GB); Yiren Xia, Milton Keynes (GB); Celedonia Krawczyk, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 17/977,325

(22) Filed: Oct. 31, 2022

(65) Prior Publication Data

US 2023/0314802 A1    Oct. 5, 2023

(30) Foreign Application Priority Data

Mar. 29, 2022    (GB) ..................................... 2204411

(51) Int. Cl.
*G02B 27/01*    (2006.01)
*F21V 8/00*    (2006.01)

(52) U.S. Cl.
CPC ....... *G02B 27/0103* (2013.01); *G02B 6/0036* (2013.01); *G02B 2027/0118* (2013.01); *G02B 2027/0123* (2013.01); *G02B 2207/123* (2013.01)

(58) Field of Classification Search
CPC .............. G02B 27/0103; G02B 6/0036; G02B 2027/0118; G02B 2027/0123; G02B 2027/123
See application file for complete search history.

(56) References Cited

U.S. PATENT DOCUMENTS

| 4,799,746 A | * | 1/1989 | Wreede | ................... G03H 1/18 |
| 4,815,800 A | * | 3/1989 | Chern | ..................... G03C 1/66 |
| | | | | 359/13 |
| 5,013,494 A | * | 5/1991 | Kubo | .................. B29C 45/0001 |
| | | | | 264/1.36 |

(Continued)

FOREIGN PATENT DOCUMENTS

| CN | 102012617 A | 4/2011 |
| DE | 102018213061 A1 | 1/2020 |

(Continued)

OTHER PUBLICATIONS

Blanche et al., Curved waveguide combiner for HUD/AR, Proc. SPIE 11828, ODS 2021: Industrial Optical Devices and Systems, 1182806 (Sep. 7, 2021); https://doi.org/10.1117/12.2592767 (Year: 2021).*

(Continued)

*Primary Examiner* — Peter Radkowski
(74) *Attorney, Agent, or Firm* — McDonnell Boehnen Hulbert & Berghoff LLP

(57) ABSTRACT

A head-up display for a vehicle comprises an optical component having a reflective surface arranged, during head-up display operation, in a configuration that is conducive to sunlight glare. A light control layer is disposed on the optical component to receive sunlight on an optical path to the reflective surface. The light control layer comprises a sunlight-receiving surface and a core material separating an array of louvres. The sunlight-receiving surface of the light control layer is serrated in coordination with the array of louvres so as to deflect received sunlight away from the eye-box of the head-up display.

17 Claims, 10 Drawing Sheets

(56) References Cited

U.S. PATENT DOCUMENTS

| | | | |
|---|---|---|---|
| 5,096,278 A | 3/1992 | Yoshioka et al. | |
| 5,138,470 A * | 8/1992 | Moss | G02B 27/0103 359/13 |
| 5,196,951 A * | 3/1993 | Wreede | G02B 5/32 359/25 |
| 5,760,931 A * | 6/1998 | Saburi | G02B 27/0149 359/13 |
| 5,907,312 A * | 5/1999 | Sato | G02B 30/54 359/558 |
| 6,905,219 B2 * | 6/2005 | Gaides | G02B 5/003 362/330 |
| 7,924,146 B2 * | 4/2011 | Seder | G01S 13/931 345/7 |
| 8,072,686 B2 * | 12/2011 | Cui | G01S 13/867 359/633 |
| 8,164,543 B2 * | 4/2012 | Seder | G02B 27/01 340/461 |
| 8,269,652 B2 * | 9/2012 | Seder | G02B 27/01 340/436 |
| 8,317,329 B2 * | 11/2012 | Seder | G01S 13/867 359/452 |
| 8,330,673 B2 * | 12/2012 | Cui | G01S 13/723 348/115 |
| 8,344,894 B2 * | 1/2013 | Szczerba | G01S 13/867 340/576 |
| 8,350,724 B2 * | 1/2013 | Szczerba | G01S 13/931 340/932.2 |
| 8,358,224 B2 * | 1/2013 | Seder | G01S 13/931 345/7 |
| 8,384,531 B2 * | 2/2013 | Szczerba | G01S 13/867 340/435 |
| 8,384,532 B2 * | 2/2013 | Szczerba | G01S 13/867 345/7 |
| 8,395,529 B2 * | 3/2013 | Seder | G08G 1/168 382/104 |
| 8,427,395 B2 * | 4/2013 | Seder | G01S 13/931 345/7 |
| 8,482,486 B2 * | 7/2013 | Seder | G08G 1/165 345/7 |
| 8,547,298 B2 * | 10/2013 | Szczerba | G01S 13/867 340/436 |
| 8,564,502 B2 * | 10/2013 | Cui | G01S 13/723 345/7 |
| 8,629,784 B2 * | 1/2014 | Szczerba | G01S 13/723 340/905 |
| 8,629,903 B2 * | 1/2014 | Seder | G02B 27/01 348/113 |
| 8,704,653 B2 * | 4/2014 | Seder | G01S 13/867 340/436 |
| 8,817,090 B2 * | 8/2014 | Szczerba | G01S 13/867 348/113 |
| 8,830,141 B2 * | 9/2014 | Seder | G02B 27/0018 345/7 |
| 8,912,978 B2 * | 12/2014 | Szczerba | G06V 10/806 701/1 |
| 8,977,489 B2 * | 3/2015 | Szczerba | G01S 13/867 701/428 |
| 9,162,622 B2 * | 10/2015 | Szczerba | B60J 1/00 |
| 9,329,325 B2 * | 5/2016 | Simmonds | G02B 6/0061 |
| 9,599,813 B1 * | 3/2017 | Stratton | G02B 27/0149 |
| 9,679,367 B1 * | 6/2017 | Wald | G02B 5/23 |
| 9,885,877 B2 * | 2/2018 | Yonekubo | G06F 3/012 |
| 10,061,268 B2 * | 8/2018 | Christmas | B60Q 1/085 |
| 10,267,970 B2 * | 4/2019 | Jones, Jr. | G02C 11/10 |
| 10,347,030 B2 * | 7/2019 | Mullins | G06T 3/4092 |
| 10,401,620 B1 * | 9/2019 | Stratton | G02B 6/0035 |
| 10,437,064 B2 * | 10/2019 | Popovich | G02B 6/0016 |
| 10,444,419 B2 * | 10/2019 | Bhargava | G09G 3/2003 |
| 10,481,317 B2 * | 11/2019 | Peroz | G09G 3/2044 |
| 10,627,559 B2 * | 4/2020 | Curtis | G02B 7/008 |
| 10,690,851 B2 * | 6/2020 | Waldern | G02B 27/0081 |
| 10,725,223 B2 * | 7/2020 | Schowengerdt | G02B 27/0172 |
| 10,761,330 B2 * | 9/2020 | Lee | G02B 27/0172 |
| 10,823,894 B2 * | 11/2020 | Peroz | G02B 6/0035 |
| 10,831,025 B2 * | 11/2020 | Kadono | G02B 27/02 |
| 10,843,686 B2 * | 11/2020 | Mullins | B60K 35/00 |
| 10,914,950 B2 * | 2/2021 | Waldern | G02B 27/0179 |
| 10,983,263 B2 * | 4/2021 | Kleinman | H05K 7/20963 |
| 11,150,408 B2 * | 10/2021 | Waldern | G02B 6/274 |
| 11,215,896 B2 * | 1/2022 | Kadono | G02F 1/155 |
| 11,314,084 B1 * | 4/2022 | Stratton | G01C 3/06 |
| 11,333,878 B2 * | 5/2022 | Machida | G02B 27/017 |
| 11,378,860 B2 * | 7/2022 | Ishii | G02F 1/153 |
| 11,428,859 B2 * | 8/2022 | Curtis | G02B 5/3025 |
| 11,543,774 B2 * | 1/2023 | Smith | G03H 1/2645 |
| 11,604,310 B2 * | 3/2023 | Schowengerdt | G06F 1/206 |
| 2003/0160736 A1 * | 8/2003 | Faso | G02B 27/01 345/8 |
| 2003/0210535 A1 * | 11/2003 | Gaides | G02B 5/003 362/330 |
| 2006/0132914 A1 * | 6/2006 | Weiss | G02B 30/40 359/462 |
| 2006/0164729 A1 | 7/2006 | Wood | |
| 2010/0253489 A1 * | 10/2010 | Cui | G08G 1/165 340/425.5 |
| 2010/0253492 A1 * | 10/2010 | Seder | G01S 13/931 348/148 |
| 2010/0253493 A1 * | 10/2010 | Szczerba | G02B 27/01 345/593 |
| 2010/0253526 A1 * | 10/2010 | Szczerba | G08B 21/06 340/576 |
| 2010/0253539 A1 * | 10/2010 | Seder | G01C 21/365 340/902 |
| 2010/0253540 A1 * | 10/2010 | Seder | G08G 1/166 348/148 |
| 2010/0253541 A1 * | 10/2010 | Seder | G08G 1/0962 340/905 |
| 2010/0253542 A1 * | 10/2010 | Seder | G01S 13/931 340/425.5 |
| 2010/0253543 A1 * | 10/2010 | Szczerba | G06V 20/58 340/932.2 |
| 2010/0253593 A1 * | 10/2010 | Seder | G01S 17/86 701/31.4 |
| 2010/0253594 A1 * | 10/2010 | Szczerba | G08G 1/167 345/7 |
| 2010/0253595 A1 * | 10/2010 | Szczerba | G02B 27/01 701/31.4 |
| 2010/0253596 A1 * | 10/2010 | Szczerba | G01S 13/867 345/7 |
| 2010/0253597 A1 * | 10/2010 | Seder | G08G 1/166 348/148 |
| 2010/0253598 A1 * | 10/2010 | Szczerba | G06V 10/806 701/532 |
| 2010/0253599 A1 * | 10/2010 | Szczerba | G01S 13/723 345/7 |
| 2010/0253600 A1 * | 10/2010 | Seder | G01S 13/723 345/7 |
| 2010/0253601 A1 * | 10/2010 | Seder | G01S 13/723 345/7 |
| 2010/0253602 A1 * | 10/2010 | Szczerba | G06V 20/588 345/8 |
| 2010/0253688 A1 * | 10/2010 | Cui | G02B 27/01 345/443 |
| 2010/0253918 A1 * | 10/2010 | Seder | G01S 13/867 353/13 |
| 2010/0254019 A1 * | 10/2010 | Cui | G01S 13/723 250/461.1 |
| 2010/0289632 A1 * | 11/2010 | Seder | G06V 10/95 382/104 |
| 2010/0292886 A1 * | 11/2010 | Szczerba | G01S 13/723 701/31.4 |
| 2012/0044572 A1 * | 2/2012 | Simmonds | G02B 6/0061 385/37 |
| 2013/0120825 A1 | 5/2013 | Lambert | |
| 2014/0091989 A1 * | 4/2014 | Szczerba | G08G 1/167 345/7 |
| 2016/0161755 A1 * | 6/2016 | Yonekubo | G02B 6/0026 345/8 |

(56) References Cited

U.S. PATENT DOCUMENTS

| | | | |
|---|---|---|---|
| 2017/0269428 | A1 | 9/2017 | Christmas |
| 2018/0011324 | A1* | 1/2018 | Popovich ............. G02B 6/0058 |
| 2018/0052276 | A1* | 2/2018 | Klienman ............... G06F 1/203 |
| 2018/0052277 | A1* | 2/2018 | Schowengerdt ........ G06F 3/013 |
| 2018/0052320 | A1* | 2/2018 | Curtis .................. G02B 6/0016 |
| 2018/0052501 | A1* | 2/2018 | Jones, Jr. ................ G06F 1/163 |
| 2018/0059297 | A1* | 3/2018 | Peroz ................... G02B 6/0076 |
| 2018/0059304 | A1* | 3/2018 | Bhargava ............. G02B 5/3025 |
| 2018/0239147 | A1* | 8/2018 | Schowengerdt ..... G02B 6/0026 |
| 2018/0322845 | A1* | 11/2018 | Machida ............... G02F 1/1523 |
| 2018/0330531 | A1* | 11/2018 | Mullins ................. G06T 19/006 |
| 2018/0354509 | A1* | 12/2018 | Mullins .................. B60K 35/00 |
| 2019/0212557 | A1* | 7/2019 | Waldern ............. G02B 27/0101 |
| 2019/0227309 | A1* | 7/2019 | Kadono ................... G09G 3/36 |
| 2019/0227321 | A1* | 7/2019 | Lee .................... G02B 27/0101 |
| 2019/0285796 | A1* | 9/2019 | Waldern ............. G02B 27/0081 |
| 2020/0004201 | A1* | 1/2020 | Smith .................. G03H 1/2645 |
| 2020/0026077 | A1 | 1/2020 | Christmas |
| 2020/0041712 | A1* | 2/2020 | Peroz ..................... G06F 3/013 |
| 2020/0041793 | A1* | 2/2020 | Kadono .................. G02F 1/155 |
| 2020/0209459 | A1* | 7/2020 | Curtis .................. G02B 6/0023 |
| 2020/0264486 | A1* | 8/2020 | Kadono ................. G02F 1/1524 |
| 2020/0284967 | A1* | 9/2020 | Schowengerdt ..... G02B 6/0035 |
| 2020/0319404 | A1* | 10/2020 | Waldern ............... G02B 6/2726 |
| 2020/0349902 | A1* | 11/2020 | Machida .................. G09G 3/38 |
| 2020/0355976 | A1* | 11/2020 | Ishii ........................ G02F 1/161 |
| 2021/0132379 | A1* | 5/2021 | Dittrich ............. G02B 27/0103 |
| 2021/0149202 | A1* | 5/2021 | Machida .................. H04N 5/64 |
| 2021/0240052 | A1* | 8/2021 | Uenoyama .............. G02F 1/355 |
| 2021/0373330 | A1* | 12/2021 | Urey .................. G02B 26/0816 |
| 2022/0082739 | A1* | 3/2022 | Franke ............... G02B 27/0172 |
| 2022/0252879 | A1 | 8/2022 | Christmas |
| 2022/0381969 | A1* | 12/2022 | Curtis .................... G09G 3/001 |
| 2023/0064690 | A1 | 3/2023 | Christmas |
| 2023/0129889 | A1* | 4/2023 | Schowendgerdt .......................... H05K 7/20963 359/566 |
| 2023/0141643 | A1* | 5/2023 | Smith .................. G03H 1/0244 359/22 |
| 2023/0176375 | A1 | 6/2023 | Wolf |

FOREIGN PATENT DOCUMENTS

| | | | |
|---|---|---|---|
| GB | 2472444 | A | 2/2011 |
| GB | 2112213.0 | | 8/2021 |
| GB | 2603517 | A | 8/2022 |
| GB | 2603518 | A | 8/2022 |
| GB | 2610203 | A | 3/2023 |
| JP | S56111804 | A | 9/1981 |
| JP | S61238015 | A | 10/1986 |
| JP | 2000193809 | A | 7/2000 |
| JP | 2005-500567 | A | 1/2005 |
| WO | 03/016982 | A2 | 2/2003 |

OTHER PUBLICATIONS

Blanche et al., Curved Holographic Waveguide Combiner for HUD and AR Display, in OSA Imaging and Applied Optics Congress 2021 (3D, COSI, DH, ISA, pcAOP) (Year: 2021).*

Chen et al., Wide-Field-of-View Near-Eye Display with Dual-Channel Waveguide. Photonics 2021, 8, 557. https://doi.org/10.3390/photonics8120557 (Year: 2021).*

Cheng et al. Design and manufacture AR head-mounted displays: A review and outlook Light: Advanced Manufacturing (2021)2:24 Official journal of the JHL 2689-9620 https://doi.org/10.37188/lam.2021.024 (Year: 2021).*

Draper et al., Examining aberrations due to depth of field in holographic pupil replication waveguide systems, Appl. Opt. 60, 1653-1659 (2021) (Year: 2021).*

Geints et al., Apodization-Assisted Subdiffraction Near-Field Localization in 2D Phase Diffraction Grating. Annalen Der Physik 2019, 531, 1900033. https://doi.org/10.1002/andp.201900033 (Year: 2019).*

Kamali et al., Metasurface-based compact light engine for AR headsets. In: Optical Design Challenge 2019. Proceedings of SPIE. No. 11040. Society of Photo-optical Instrumentation Engineers (SPIE), Bellingham, WA, Art. No. 1104002. ISBN 9781510627468. (Year: 2019).*

Kao et al., Crosstalk-Reduced Double-Layer Half-Divided Volume Holographic Concentrator for Solar Energy Concentration. Sensors 2020, 20, 6903. https://doi.org/10.3390/s20236903 (Year: 2020).*

Kress et al., Waveguide combiners for mixed reality headsets: a nanophotonics design perspective Nanophotonics, vol. 10, No. 1, 2021, pp. 41-74. https://doi.org/10.1515/nanoph-2020-0410 (Year: 2021).*

Lee et al., Metasurface eyepiece for augmented reality. Nat Commun 9, 4562 (2018). https://doi.org/10.1038/s41467-018-07011-5 (Year: 2018).*

Lee et al., Automotive augmented reality 3D head-up display based on light-field rendering with eye-tracking, Opt. Express 28, 29788-29804 (2020) (Year: 2020).*

Malek et al., Active nonlocal metasurfaces Nanophotonics, vol. 10, No. 1, 2021, pp. 655-665. https://doi.org/10.1515/nanoph-2020-0375 (Year: 2020).*

Skirnewskaja et al., Automotive Holographic Head-Up Displays. Adv. Mater. 2022, 34, 2110463. https://doi.org/10.1002/adma.202110463 (Year: 2022).*

Sung et al., Progresses in the practical metasurface for holography and lens Nanophotonics, vol. 8, No. 10, 2019, pp. 1701-1718. https://doi.org/10.1515/nanoph-2019-0203 (Year: 2019).*

Verre et al., Directional Light Extinction and Emission in a Metasurface of Tilted Plasmonic Nanopillars, Nano Lett. 2016, 16, 1, 98-104, https://doi.org/10.1021/acs.nanolett.5b03026 (Year: 2016).*

Wu et al., Design of high-efficiency all-dielectric polymer metasurfaces beam deflection blazed grating, Results in Physics, vol. 17, 2020, 103094, (Year: 2020).*

Zhang et al., See-Through Near-Eye Display with Built-in Prescription and Two-Dimensional Exit Pupil Expansion. Applied Sciences. 10. 3901. 10.3390/app10113901. 2020 (Year: 2020).*

Zhou et al., Multifunctional metaoptics based on bilayer metasurfaces. Light Sci Appl 8, 80 (2019). https://doi.org/10.1038/s41377-019-0193-3 (Year: 2019).*

He et al., Metasurface-assisted broadband optical absorption in ultrathin perovskite films, Opt. Express 29, 19170-19182 (2021) (Year: 2021).*

Liang et al., High-Efficiency, Near-Diffraction Limited, Dielectric Metasurface Lenses Based on Crystalline Titanium Dioxide at Visible Wavelengths. Nanomaterials 2018, 8, 288. https://doi.org/10.3390/nano8050288 (Year: 2018).*

Xiong et al., Augmented reality and virtual reality displays: emerging technologies and future perspectives. Light Sci Appl. Oct. 25, 2021;10(1):216. doi: 10.1038/s41377-021-00658-8. PMID: 34697292; PMCID: PMC8546092 (Year: 2021).*

Kim et al., Doublet metalens design for high numerical aperture and simultaneous correction of chromatic and monochromatic aberrations, Opt. Express 28, 18059-18076 (2020) (Year: 2020).*

Wang et al., Embedded slanted grating for vertical coupling between fibers and silicon-on-insulator planar waveguides, in IEEE Photonics Technology Letters, vol. 17, No. 9, pp. 1884-1886, Sep. 2005, doi: 10.1109/LPT.2005.853236 (Year: 2005).*

Wang et al., Light Management with Grating Structures in Optoelectronic Devices, Chem., Jul. 28, 2021 Sec. Nanoscience vol. 9-2021 | https://doi.org/10.3389/fchem.2021.737679 (Year: 2021).*

Copending U.S. Appl. No. 18/042,759, entered US national stage filed Feb. 23, 2023.

UK Patent Application No. 2204411.9, Combined Search and Examination Report, dated Sep. 14, 2022.

UK Patent Application No. 2204411.9, Applicant's response including amended claims, dated Nov. 8, 2022.

UK Patent Application No. 2204411.9, Examiner confirmation of withdrawn objections, dated Jan. 3, 2023.

UK Patent Application No. 2204411.9, Notification of Intention to Grant, dated Apr. 14, 2023.

UK Patent Application No. 2204411.9, Notification of Grant, dated May 31, 2023.

(56) References Cited

OTHER PUBLICATIONS

Copending U.S. Appl. No. 18/203,838 (continuation of present application), filed May 31, 2023.
UKIPO, Combined Search and Examination Report under Sections 17 and 18(3), Application No. GB 2306230.0, mailed Oct. 30, 2023, 6 pages.
European Search Report, Patent Application No. EP23155027.8, dated Sep. 10, 2023.

* cited by examiner

DISPLAY SYSTEM AND LIGHT CONTROL FILM THEREFOR

CROSS-REFERENCE TO RELATED APPLICATIONS

The present application is a non-provisional patent application claiming priority to United Kingdom Patent Application No. GB 2204411.9, filed Mar. 29, 2022, the contents of which are hereby incorporated by reference in their entirety.

FIELD

The present disclosure relates to a display system, in particular, a display system using a diffracted light field comprising diverging ray bundles. More specifically, the present disclosure relates to a display system comprising a waveguide pupil expander and to a method of pupil expansion using a waveguide. The present disclosure further relates to a light control film for an optical component of a display system, such as a waveguide pupil expander. Some embodiments relate to picture generating unit and a head-up display, for example an automotive head-up display (HUD).

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 meter viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 meter. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye-box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a "light cone". Thus, the size of the diffracted light field (as defined on a two-dimensional plane) increases with propagation distance from the corresponding diffractive structure (i.e. display device).

The spatial light modulator may be arranged to display a hologram. The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye-box within which a viewer's eye can be located, in order to see/receive light that is output by the system.

There is provided a head-up display for a vehicle. The head-up display comprises an optical component having a reflective surface. During head-up display operation, the optical component is arranged in a configuration that is conducive to sunlight glare. It may be said that the configuration is such that the optical component, such as the reflective surface thereof, is susceptible to cause glare to a viewer of the head-up display from sunlight incident thereon (e.g. by directing or propagating sunlight to the eye-box). In particular, the reflective surface of the optical component may receive sunlight and direct the sunlight to an eye-box area (or viewing window) of the head-up display so as to cause glare. A light control layer is disposed on the optical component to receive sunlight on an optical path to the reflective surface. The light control layer comprises a sunlight-receiving surface and a core material separating an array of louvres. The sunlight-receiving surface of the light control layer is serrated in coordination with the array of louvres.

Accordingly, the light control layer is configured to control incident sunlight without significantly altering the function of the optical component. In particular, the light control layer may direct received sunlight away from the eye-box of the head-up display. Thus, the risk of glare to the viewer due to sunlight is reduced.

As used herein, a louvre may be an angled slat. So, the array of louvres may comprise a plurality of angled slats. Each of the plurality of angled slats may be parallel. In some embodiments, adjacent louvres of the array of louvres may be uniformly spaced (i.e. the louvres have a constant "louvre pitch"). Thus, it may be said that the array of louvres has a periodicity. In embodiments, the periodicity of the serration of the sunlight-receiving surface is substantially equal to a periodicity of the array of louvres.

Typically, the array of louvres is a two-dimensional array having a first and second dimension. For example, the louvres are arranged in an array that extends in a first dimension—i.e. the louvres are separated from each other by a spacing in the first dimension—and each louvre has a length that extends in a second dimension. The reflective surface of the optical component may be planar. The first and second dimensions may correspond to the dimensions of the planar reflective surface of the optical component. In embodiments, the serrated configuration of the sunlight-receiving surface is one-dimensional and extends in the first dimension. For example, the serrated configuration may be a sawtooth configuration comprising a one-dimensional array of spaced serrations, projections or teeth separated by angled or curved surfaces.

In examples, the first and second dimensions are perpendicular to each other. Sunlight may be incident on a planar reflective surface of the optical component in the first and second dimensions. Thus, it may be said that at least a component of the angle of rays of incident sunlight is in a third dimension. However, due to the serrated configuration, the sunlight-receiving surface of the light control layer is non-planar between louvres in the first dimension.

In embodiments, the louvres are tilted. In particular, the louvres may be tilted from an orthogonal orientation relative to the plane of the light control layer and/or planar reflective surface of the optical component. In addition, or alternatively, one or both of the sidewalls of the louvres may be sloped, such that each louvre has a trapezoid cross section.

In embodiments, the louvres are configured to attenuate sunlight, such as absorb sunlight. For example, the louvres may be formed by depositing a light attenuating or absorbing material in an array of louvre-shaped trenches or grooves in the core material. In examples, all of the louvres in the array have substantially the same pitch, orientation and geometry.

In embodiments, the core material is substantially transmissive to image light of the head-up display. For example, the core material may be optically transparent to light of wavelengths corresponding the image light. In examples, the array of louvres is configured to transmit rays of image light of the head-up display, which is output by the optical component, in accordance with a required range of transmission angles for propagation to a viewer's eye pupil at the eye-box so that an image can be perceived.

In some examples, the light control layer comprises an optically transparent core material having an array of light-absorbing louvres disposed therein. The arrangement of louvres allows propagation of image light of the head-up display through the optical component without altering its function. In addition, the arrangement of louvres may limit the range of angles of sunlight incident on the sunlight-receiving surface that may enter the core material into the optical component.

In some embodiments, the core material may be disposed between adjacent pairs of louvres. The core material may be disposed between each adjacent pair of louvres. Each of the louvres may be disposed within the core material.

In some embodiments the optical component is a waveguide. The waveguide may be substantially planar. In embodiments the waveguide is arranged during head-up display operation in a substantially flat configuration relative to ground (e.g. horizontal). The waveguide may form a waveguide pupil expander arranged to expand the exit pupil in the first and second dimensions.

In some embodiments, the sunlight-receiving surface is formed by an outer surface of a coating layer that covers the core material and array of louvres of the light control film. In examples, the coating layer is substantially transparent to image light of the head-up display. The coating layer may be formed of one or more materials for protecting the light control film, such as cladding, fluid resistance and/or scratch-resistance properties.

In embodiments, the sunlight-receiving surface further comprises an anti-reflection coating. For example, the anti-reflection coating may minimize specular reflection.

In some embodiments, the serration of the sunlight-receiving surface provides an array of angled surfaces that direct sunlight away from the eye-box. In particular, each of the angled surfaces forms an interface between the core material and air such that most of the sunlight incident thereon (e.g. 96% of incident sunlight) is reflected (i.e. not coupled into the light control film). The angled surfaces are orientated at an angle with respect to the plane of the light control film/optical component in the first and second dimension. The angled surfaces are arranged to direct the reflected sunlight away from a direction towards the eye-box, owing to the orientation angle thereof.

In examples, the angled surfaces of the sunlight-receiving surface change the angle of reflection of sunlight incident thereon. That is, the angle of rays of sunlight received by the angled surfaces is different from the angle of rays of the sunlight reflected by the angled surfaces, where the angles of the rays of sunlight are measured with respect to (the normal to) the plane of the light control film/optical component in the first and second dimensions. It may be said that each angled surface changes the course or path of specular reflection of incident sunlight in comparison to specular reflection by non-angled surfaces parallel to the first and second dimensions.

In embodiments, the louvres of the array of louvres are substantially parallel. In some embodiments each louvre of the array of louvres is substantially rectangular or trapezoid in cross-section.

In embodiments, the head-up display may be arranged such that an optical path of image light of the head-up display passes through the optical component before passing through the light control layer. In other words, the optical path of image light of the head-up display may not pass through the light control layer before passing through the optical component. In some embodiments, the head-up display may be arranged such that an optical path of image light of the head-up display passes through the optical component before passing through the sunlight-receiving surface. In other words, the optical path of image light of the head-up display may not pass through the optical component before passing through the sunlight-receiving surface.

Reference to a component being "conducive to sunlight glare" or "susceptible to cause glare" is used herein to mean that the component can cause glare. More specifically, the physical form, position and orientation of the component is such that received sunlight may be directed (e.g. reflected and/or propagated by the component) to an eye-box or viewing window of the head-up display. It may be said that the component, such as a reflective surface thereof, is arranged, during normal operation or usage, in a configuration that supports glare. The reflective surface is disposed on an optical path for sunlight such as direct sunlight. A configuration that is "conducive" or "supportive" to glare is a configuration in which the component could direct sunlight to an eye-box of the head-up display—for example, in a manner that degrades (the perceived) image quality.

In the present disclosure, the term "image light" is used to refer to light that is propagated to the eye-box of the head-up display so that the viewer can perceive an image. Thus, the image light may include light that is encoded with an image and spatially modulated light that is encoded with a hologram of the image, as described herein.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2π) which represents the amount of phase retardation provided by that pixel. For example, a pixel of the spatial light modulator described as having a phase value of π/2 will retard the phase of received light by π/2 radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

In the present disclosure, the term "substantially" when applied to a structural units of an apparatus may be interpreted as the technical feature of the structural units being produced within the technical tolerance of the method used to manufacture it.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
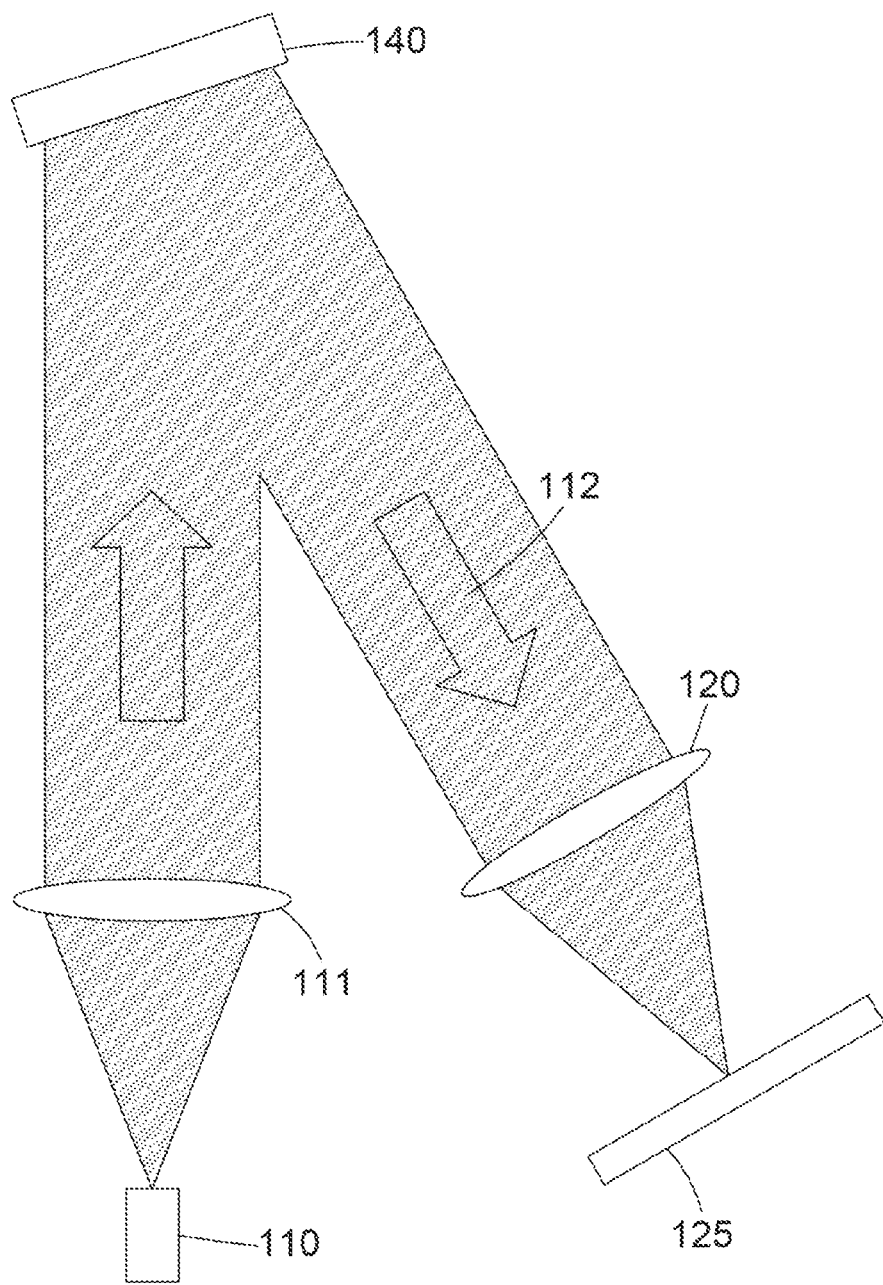
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods. United Kingdom patent application GB 2112213.0 filed 26 Aug. 2021, incorporated herein by reference, discloses example hologram calculation methods that may be combined with the present disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Light Modulation

The display system comprises a display device defining the exit pupil of the display system. The display device is a spatial light modulator. The spatial light modulation may be a phase modulator. The display device may be a liquid crystal on silicon, "LCOS", spatial light modulator.

Light Channeling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

A display system and method are described herebelow, which comprise a waveguide pupil expander. As will be familiar to the skilled reader, the waveguide may be configured as a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SL M. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channeling of the diffracted light field. This is described in detail in each of GB2101666.2, GB2101667.0, and GB2112213.0, all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 2:
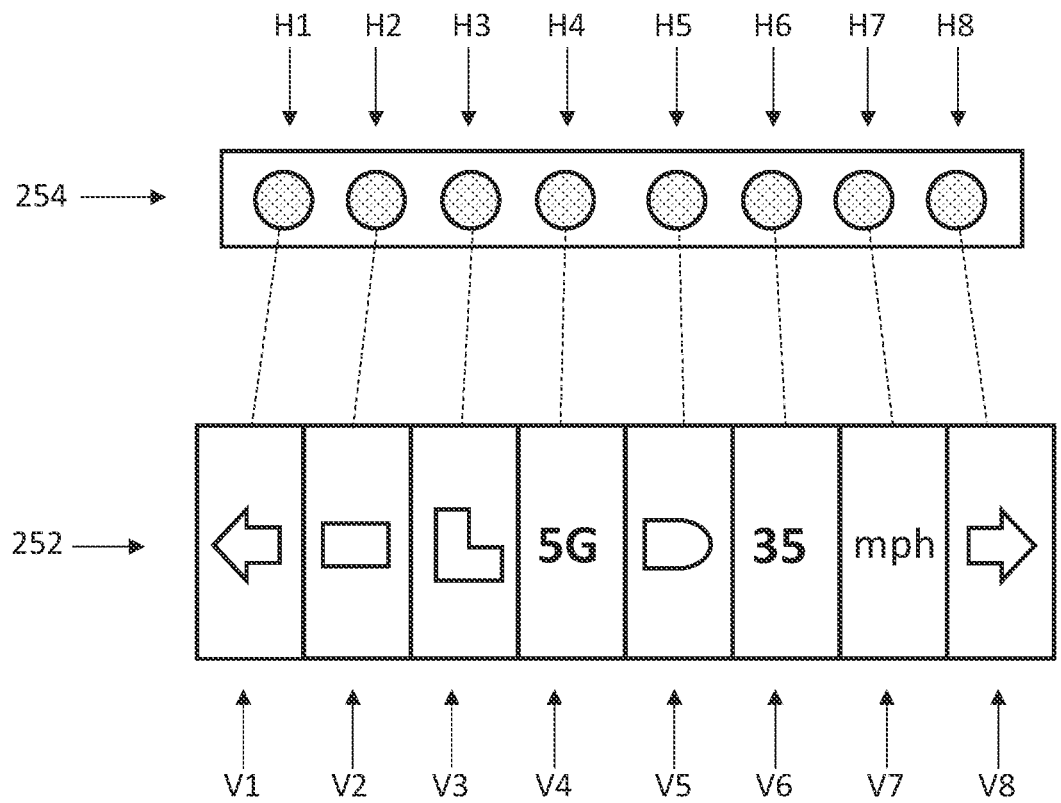
FIG. 2 shows an image for projection comprising eight image areas/components, V1 to V8.
Figure 3:
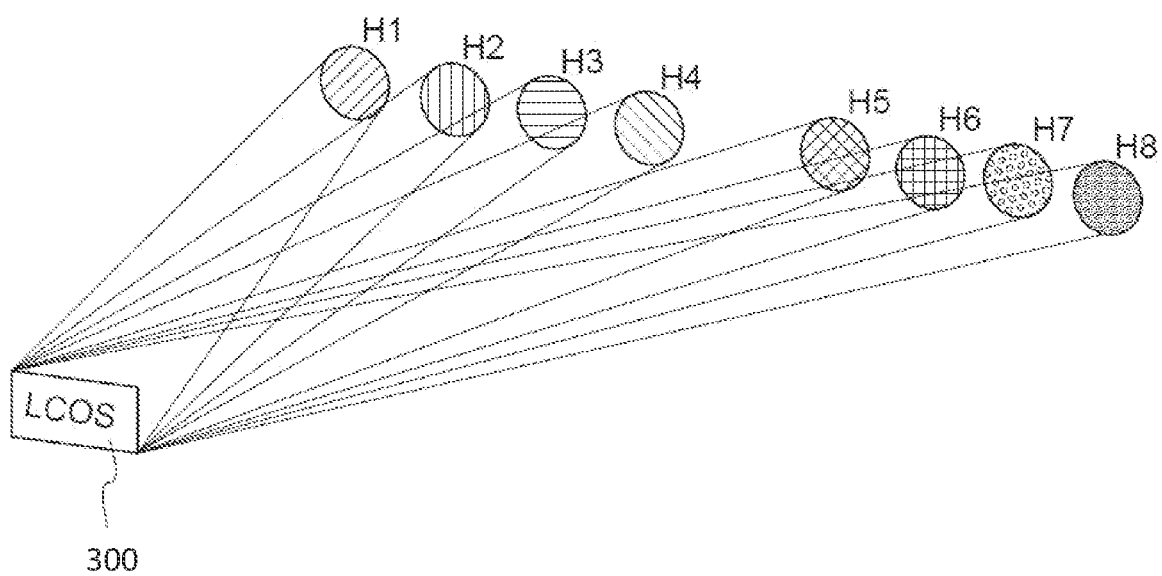
FIG. 3 shows a hologram displayed on an LCOS that directs light into a plurality of discrete areas.

FIGS. 2 and 3 show an example of a type of hologram that may be displayed on a display device such as an SLM, which can be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channeling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

Figure 4:
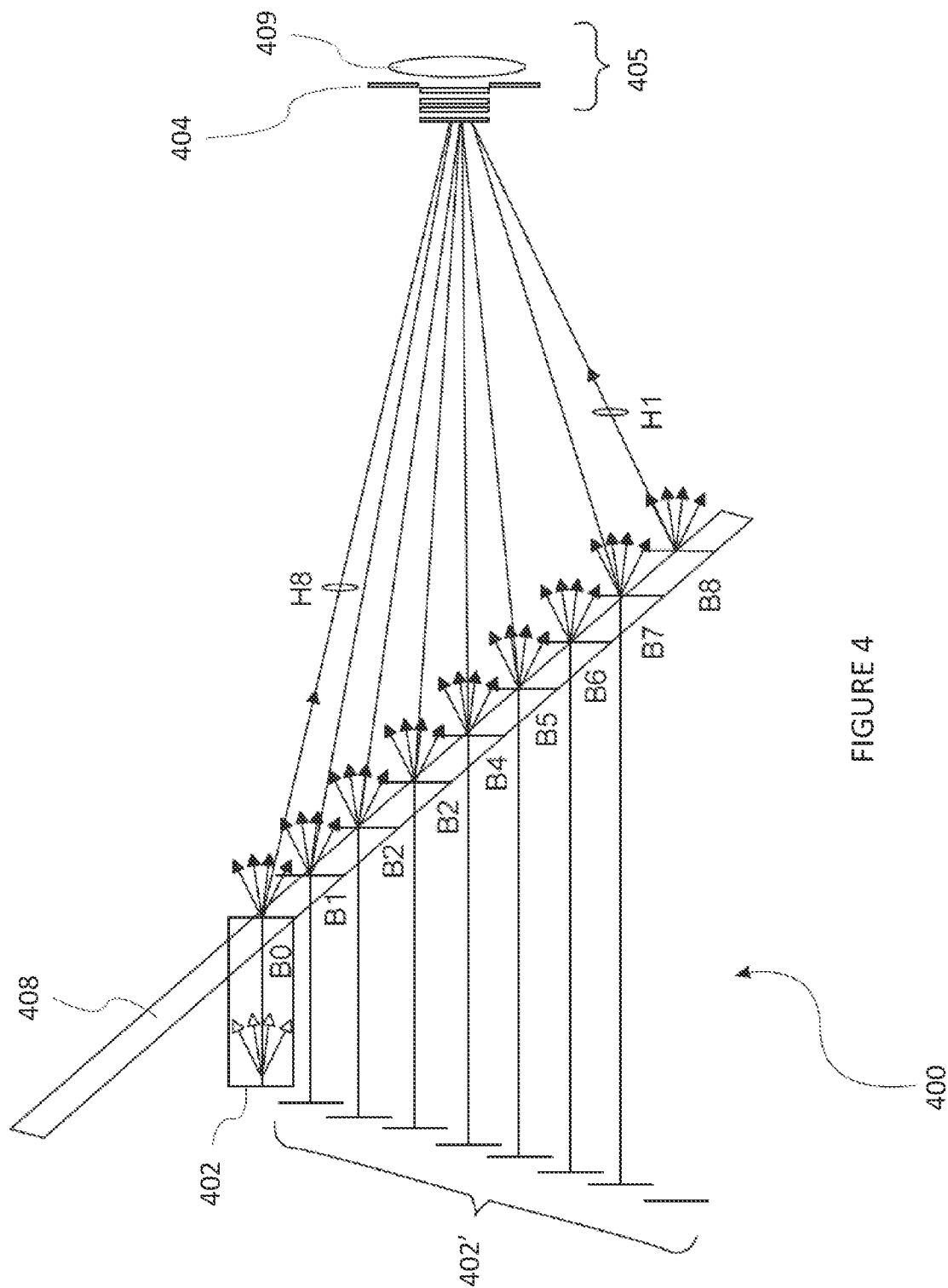
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The methods and arrangements described above can be implemented in a variety of different applications and viewing systems. For example, they may be implemented in a head-up-display (HUD) or in a head or helmet mounted device (HMD) such as an Augmented Reality (AR) HMD.

Although virtual images, which require the eye to transform received modulated light in order to form a perceived image, have generally been discussed herein, the methods and arrangements described herein can be applied to real images.

Two-Dimensional Pupil Expansion

Figure 5:
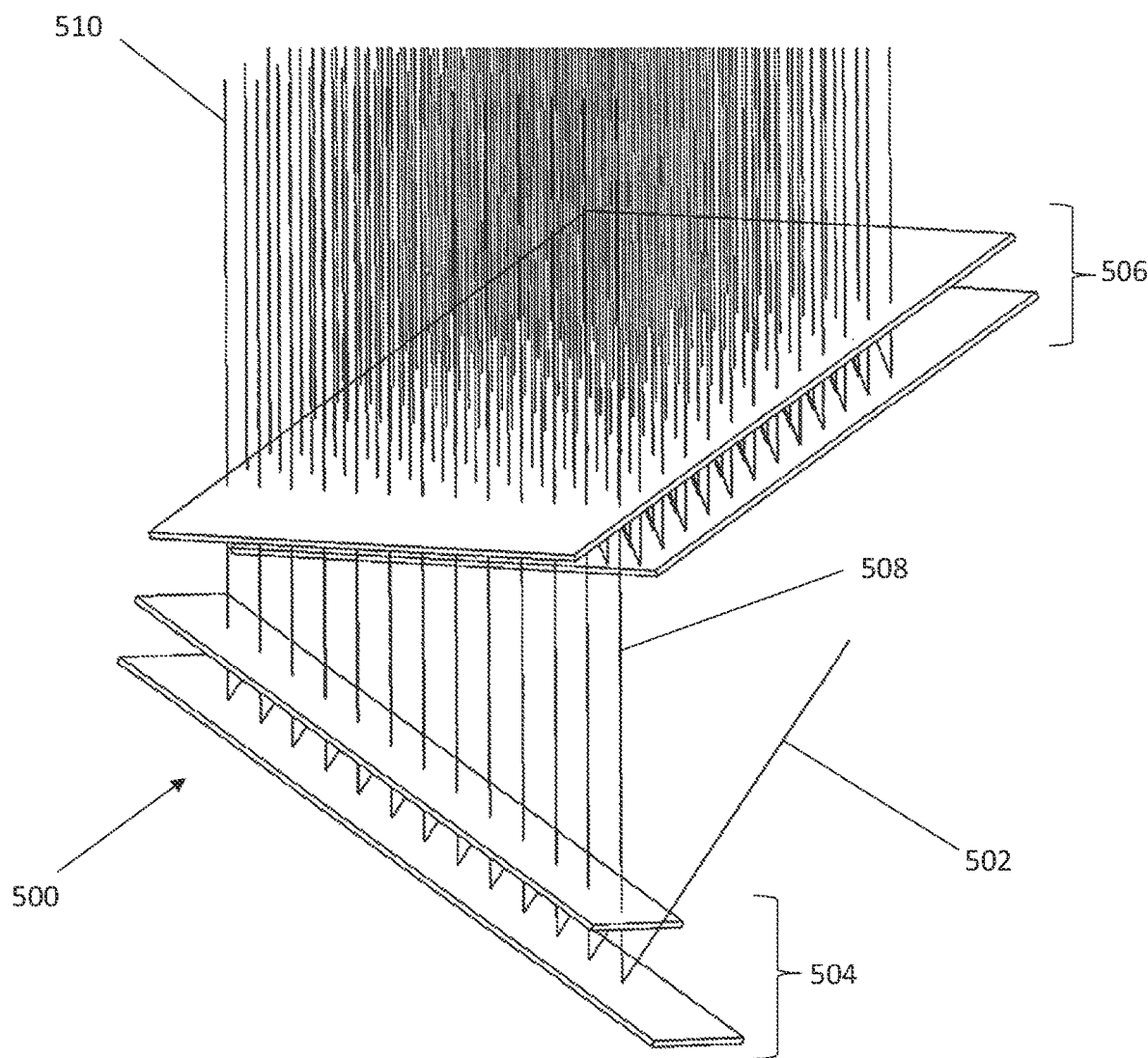
FIG. 5 shows a perspective view of a system comprising two replicators arranged for expanding a light beam in two dimensions.

Whilst the arrangement shown in FIG. 5 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

FIG. 5 shows a perspective view of a system 500 comprising two replicators, 504, 506 arranged for expanding a light beam 502 in two dimensions.

In the system 500 of FIG. 5, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5 combine to provide a two-dimensional replicator (or, "two-dimensional pupil expander").

Light Control Film

In operation, the transmission surface (i.e. expanded exit pupil) of the second replicator 506 of the two-dimensional pupil expander of FIG. 5 forms an external surface from which image light is transmitted through air to an eye-box area for viewing. Accordingly, the transmission surface may be exposed to sunlight from the environment in which the head-up display is used. Received sunlight may cause glare to the viewer. For example, glare may arise if sunlight is directly reflected from the external transmission surface at angles such that rays of sunlight follow an optical path to the eye-box. In another example, glare may arise if sunlight is coupled into the second replicator at angles such that rays of sunlight follow the same optical path within the replicator as rays of image light in order to reach the eye-box.

Accordingly, the inventors propose using a light control film over the transmission surface of the second replicator 506 to control the direction of received sunlight to reduce the risk of glare to the viewer. An example light control film for controlling the direction of transmitted light comprises an optically transparent film having a plurality of parallel louvres formed of a light absorbing material. Such a light control film is conventionally used to control the direction of transmitted light from a vehicle display system, in order to prevent light emitted from the display system being received by, and so reflected from, vehicle windows causing glare to the driver or passenger (e.g. at night time). However, the inventors have recognized that the same type of light control film may be used to control the direction of direct sunlight (i.e. during day time) that may be incident on the second replicator 506 due to its upwardly facing orientation adjacent a vehicle windshield. The orientation, pitch and geometry of the louvres (e.g., the side-wall angle(s)) of the light control film may be chosen to allow image light to be transmitted from the transmission surface of the second replicator 506 only at a limited range of angles necessary to reach the eye-box.

Figure 6A:
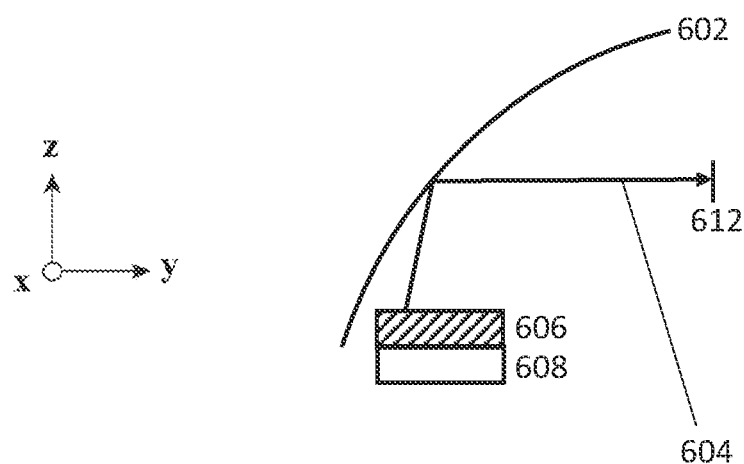
FIG. 6A is schematic side view showing an optical path of image light from a head-up display in a vehicle to an eye-box with a replicator having a light control film.
Figure 6B:
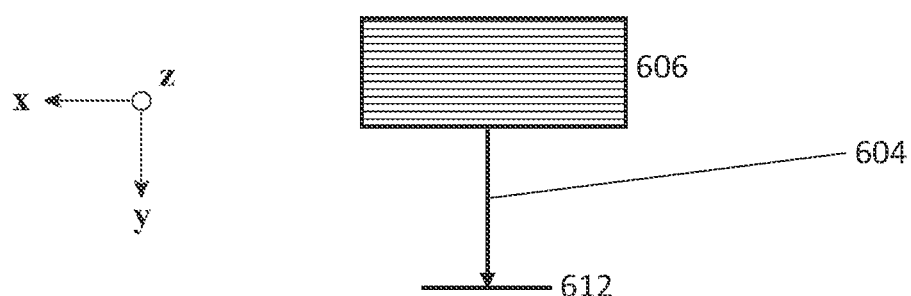
FIG. 6B is a schematic top view showing the optical path of image light from the light control film to the eye-box.

FIGS. 6A and 6B shows the use of such a light control film in a head-up display operating in a vehicle. In the illustrated arrangement, the optical component of the head-up display 608 at the interface with air (e.g. second replicator 506 in FIG. 5) is orientated substantially horizontally, illustrated as the x-y plane. For example, the optical component may be positioned in an opening in an upwardly facing surface of the vehicle dashboard. The transmission surface of the optical component is covered by a light control film 606 comprising a one-dimensional array of louvres. The louvres may be in a substantially vertical plane, illustrated as the x-z plane. In the illustrated arrangement, the louvres are tilted with respect to the vertical plane (i.e. from an orthogonal orientation relative to the plane of the light control layer). In particular, the louvres have sloped sidewalls. The louvres may be light absorbing or light attenuating.

As shown in FIG. 6A, image light from the head-up display 608 passes between the louvres of the light control film 606 and is transmitted to an optical combiner 602 (e.g. windshield). The optical combiner 602 redirects the image light substantially horizontally, illustrated as the y direction, towards the eye-box 612, where a viewer (e.g. vehicle driver) can perceive a virtual image (combined with the external scene observed through the windshield).

Figure 7:
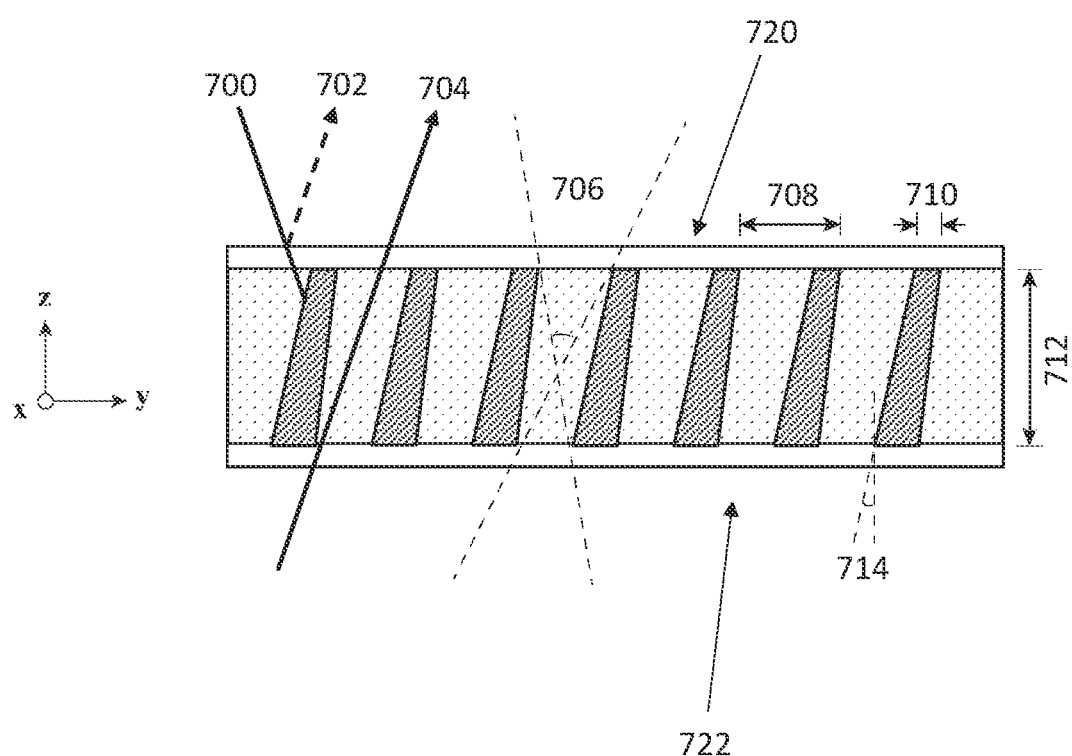
FIG. 7 is a cross section of an example light control film comprising an array of louvres.

FIG. 7 shows an example light control film comprising an array of louvres in more detail.

The light control film 712 comprises first (bottom/internal) and second (top/external) surfaces that define the thickness of the light control film 712. In the illustrated arrangement, since the surfaces of the light control film 712 may be uneven, an optically transparent coating layer (which also may be referred to as a "cladding layer") is provided on each of the first and second surfaces for planarization. Thus, light control film 712 is sandwiched between a pair of optically transparent coating or cladding layers or films having respective outer surfaces 720, 722. The skilled person will appreciate that a coating/planarization layer is not required on the first (bottom/internal) surface in arrangements in which the light control film 712 is formed directly on a planar transmission surface of the optical component (e.g. second replicator 506). The light control film 712 comprises a core of optically transparent material with a plurality of light absorbing louvres disposed therein. The louvres are periodically arranged in a one-dimensional array, illustrated as extending in the y direction, with a uniform spacing or pitch 708 between adjacent louvres. The spacing between the louvres is sufficiently small to optimize light absorption without causing diffraction or ghost images. In examples, the spacing between the louvres may be around 10-1000 μm such as 50-250 ☐☐☐ m. The louvres extend through the full thickness of the light control film 712 and are configured with an orientation, pitch and geometry arranged to limit the range of transmission angles 706 from the second (top/external) surface, as shown by dashed lines.

In the illustrated arrangement, each louvre has a trapezoidal cross section (i.e. with non-parallel, sloped sidewalls) that tapers (narrows) to a thickness 710 at the second (top/external) surface of light control film 712. Accordingly, the sidewalls of each louvre are tilted with respect to a plane perpendicular to the first and second surfaces of the light control film 712 (shown as the vertical or x-z plane), as illustrated by tilt angle 714. In the illustrated arrangement, the geometry of the louvres is the same, and the opposed sidewalls of each louvre are tilted at different angles. As the skilled person will appreciate, in other arrangements, the louvres may have a rectangular cross section (i.e. with parallel, non-sloped sidewalls) and/or may be orientated in a plane perpendicular to the first and second surfaces of the light control film 700 as well as at any desired tilt angle with respect thereto.

Accordingly, image light 704 incident from the transmission surface of the optical component of the head-up display passes through the light control film 712 and associated coating/planarization layers between the louvres. In embodiments, the louvres are geometrically configured to allow the passage of image light 704, through the optically transparent core between the louvres, at the range of angles required for the image to be visible at all positions within the eye-box. Thus, in examples that implement the special hologram, as described herein with reference to FIGS. 2 to 4, the range of transmission angles may allow all the angular channels of the hologram to reach the eye-box. For example, the image light 704 may be transmitted (e.g. as ray bundles from multiple transmission points of the optical component as described herein) at one or more defined optical path angles that pass between the louvres to the eye-box, for example as shown by the solid arrow in FIG. 7. Due to the small spacing between the louvres, each replica formed at one of the multiple transmission points along the transmission surface of the optical component may be incident upon a plurality of louvres of the light control film 712.

However, as noted above, sunlight may be incident on the second (top/external) surface of the light control film 712, as shown by arrow 700. Accordingly, the second (top/external) surface of the light control film 712 is described herein as the "light receiving surface" of the light control film 712. It will be appreciated that sunlight may be incident on the surface of the light control film 712 at any angle, and the ray angle shown by arrow 700 is merely an example. Sunlight that is coupled into the light control film 712 at the planar top surface 720 (i.e. external interface with air) may enter at an angle such that the light is directly absorbed by one of the louvres in a "first pass", as shown by arrow 700. Alternatively, sunlight that is coupled into the light control film 712 at the planar top surface 720 may enter at an angle such that the light passes between the louvres into the optical component (not shown). In this case, the sunlight reflected out of the optical component is absorbed by one of the louvres in a "second pass" and so is not transmitted by the light control film 712. However, a proportion of the sunlight may be reflected at the planar top surface 720 (i.e. external interface with air). In this case, there is a risk that the sunlight is reflected at an angle that follows an optical path to the eye-box. FIG. 7 shows an example ray of reflected sunlight 702 in dashed line at an angle parallel to a ray of the image light 704 from the head-up display that is transmitted between louvres and out of the light control film 712. It will be appreciated that the illustrated ray of image light 704 is just one example of a plurality of rays of a diverging ray bundle of a replica transmitted from a transmission point of the optical component at an angle that passes between louvres. In addition, it will be appreciated that light rays of the same replica may pass between other pairs of adjacent louvres at the same or different ray angles. Thus, the reflected ray of sunlight 702 will follow the same optical path as the illustrated ray of image light 704 to the eye-box and cause glare to the viewer. This problem is addressed by the present disclosure, as illustrated by the embodiments described below. In the description of the embodiments, similar reference numerals are used to denote similar features to the example of FIG. 7.

Figure 8:
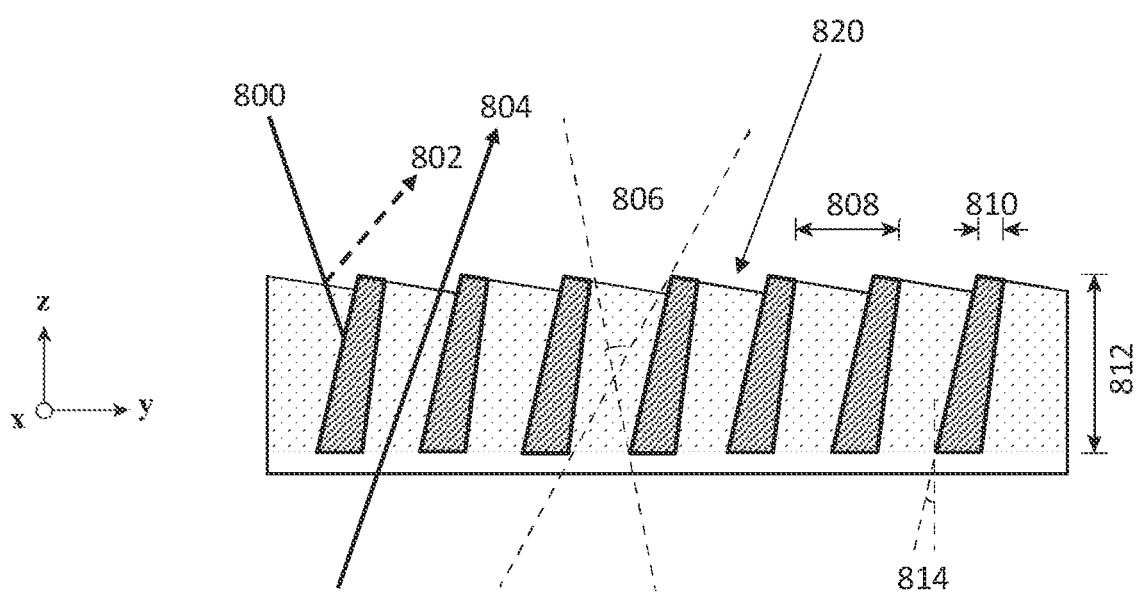
FIG. 8 is a cross section of a light control film comprising an array of louvres in accordance with a first embodiment of the present disclosure.

FIG. 8 shows a light control film 812 in accordance with an embodiment of the present disclosure. The light control film 812 is generally the same as the example of FIG. 7 described above, except that the coating layer on the second (top/external) surface of the light control film 812 is omitted. Thus, the second (top/external) surface of the light control film 812 forms the sunlight-receiving surface 820. Accordingly, as in the example of FIG. 7, the light control film 812 comprises a core of optically transparent material with a one-dimensional array of uniformly spaced louvres disposed therein. The louvres extend through the full thickness of the light control film 812 and are configured with a trapezoid configuration (i.e. with tilted or sloped sidewalls). As described above, the light control film 812 may be formed on the planar reflective surface of an optical component of the head-up display, such as the second replicator 506 of FIG. 5.

In accordance with the present disclosure, the light receiving surface 820 of the light control film 812 is serrated. In particular, the light receiving surface 820 is serrated in coordination with the array of louvres. For example, the arrangement of the serrations of the sunlight-receiving surface 820 are coordinated, synchronized or in alignment with the arrangement of the underlying array of louvres. Thus, the serrated configuration of the sunlight-receiving surface 820 is one-dimensional and extends in the first dimension. In the embodiment of FIG. 8, the serrated configuration comprises a one-dimensional array of uniformly spaced serrations (also called "projections" or "teeth") separated by surfaces that are angled with respect to the plane of the light control film 812/optical component (i.e. angled relative to the horizontal or x-y plane). Thus, in the embodiment of FIG. 8, the cross section of the sunlight-receiving surface 820 has a generally saw-tooth configuration. Furthermore, in the embodiment of FIG. 8, the uniformly spaced serrations are aligned with the louvres. Thus, it may be said that the periodicity of the serration of the sunlight-receiving surface 820 is substantially equal to the periodicity of the array of louvres.

As described above with reference to FIG. 7, light transmitted by the light control film 812 is limited to the range of angles 806 defined by the orientation, pitch and geometry (e.g., the side-wall angle) of the louvres. Thus, image light 804 from the optical component of the head-up display (not shown) is transmitted only at ray angles that fall within the limited range of angles 806, in order to pass through the light control film 712 between the louvres and follow an optical path to the eye-box. Furthermore, as described above with reference to FIG. 7, sunlight 800 that is coupled into the light control film 812 is either absorbed by one of the louvres and/or prevented from being transmitted to the eye-box due to the limited range of transmission angles 806.

In addition, in accordance with the present disclosure, sunlight 800 that is reflected by top surface 820 (i.e. external interface with air) is reflected in a direction away from the eye-box (e.g. in an automotive application, as described herein, in a direction away from a windshield that reflects image light to the eye-box) due to the serrated configuration, as shown in dashed line. In particular, due to the angled second (top/external) surface 820 of the light control film 812 over the optically transparent core regions between the louvres, the surface normal is similarly angled with respect to the normal to the plane of the light control film 812/optical component (i.e. the horizontal or x-y plane). Accordingly, due to the law of reflection, the angle of the sunlight 800 is changed (e.g. increased) in comparison to the angle of reflection with the planar surface 720 of the light control film 712 of FIG. 7. In examples, the angled surfaces are angled or inclined relative to (the normal to) the plane of the light control film 812/optical component be an angle in the range of 15 to 75; such as 30 to 60; in either direction. Significantly, the slope or inclination of the angled surfaces of the light-receiving surface 820 is such that the angle of rays of reflected sunlight 802 is not within the strict range of angles 806 allowed/required for the image light 804 from the head-up display and so the rays of sunlight do not follow an optical path to the eye-box and cause glare.

Figure 9:
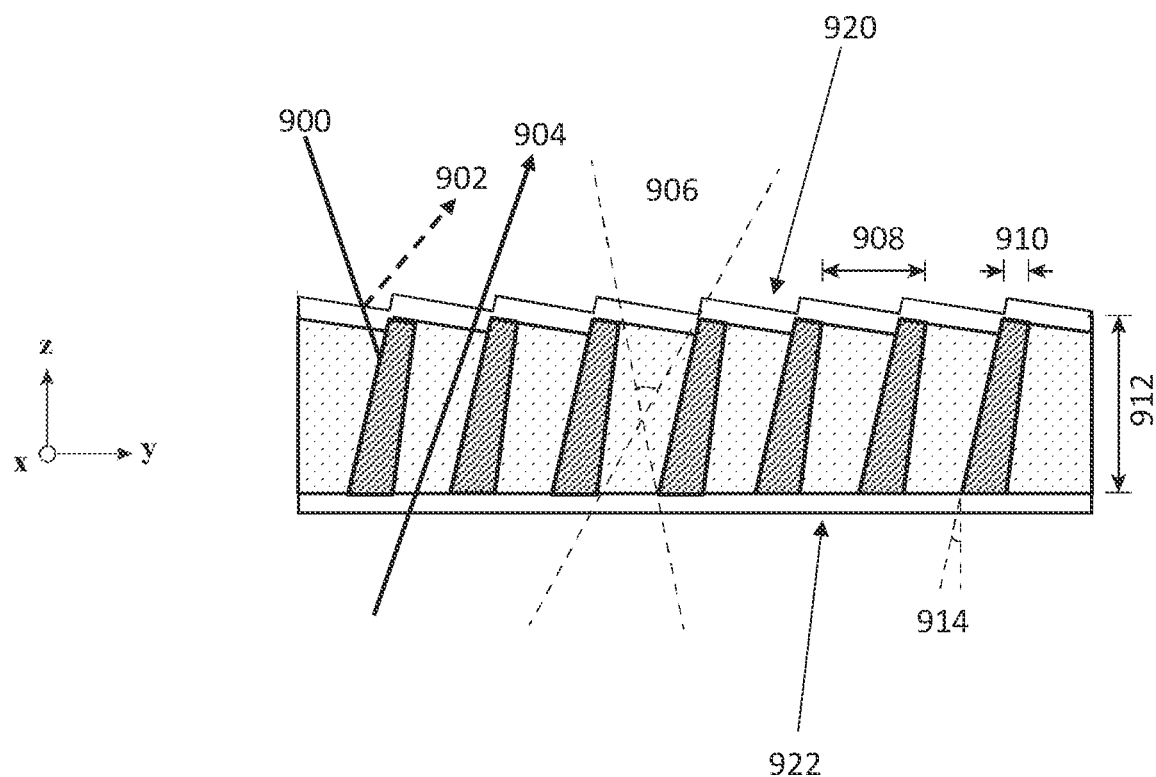
FIG. 9 is a cross section of a light control film in accordance with a second embodiment of the present disclosure.

FIG. 9 shows a light control film 912 in accordance with another embodiment. The light control film 912 of this embodiment is generally the same as the embodiment of FIG. 8 except that an optically transparent coating layer of uniform thickness is disposed on the second (top/external) surface of the light control film 912, which forms the light receiving surface 920. Thus, similar to the example of FIG. 7, light control film 912 is sandwiched between a pair of optically transparent coating or cladding layers or films having respective outer surfaces 920, 922.

Since the coating formed on the second (top/external) surface of the light control film 912 has a uniform thickness, the light receiving surface 920 has the same serrated configuration as the second (top/external) surface of the underlying light film, as in the embodiment of FIG. 8. However, the use of a coating or cladding layer on the second (top/external) surface of the light receiving film 912 may provide surface planarization, and thereby reduce any surface roughness (e.g. associated with the formation of the light control film 912), which might otherwise reduce image quality at the eye-box.

The coating may comprise any suitable optically transparent layer or film, including a multi-layered structure, that can be disposed on the serrated light receiving surface of the light control film 912 with the required uniformity of thickness. In some examples, the coating may comprise an anti-reflective coating for minimizing specular reflection. Furthermore, since the coating it exposed to the environment—such as at the dashboard in the cabin of a vehicle— the material(s) of the coating layer may also be chosen to protect the light control film 912 from damage due to external causes, for example to provide heat resistance, scratch/impact resistance, fluid resistance and other similar properties.

Figure 10:
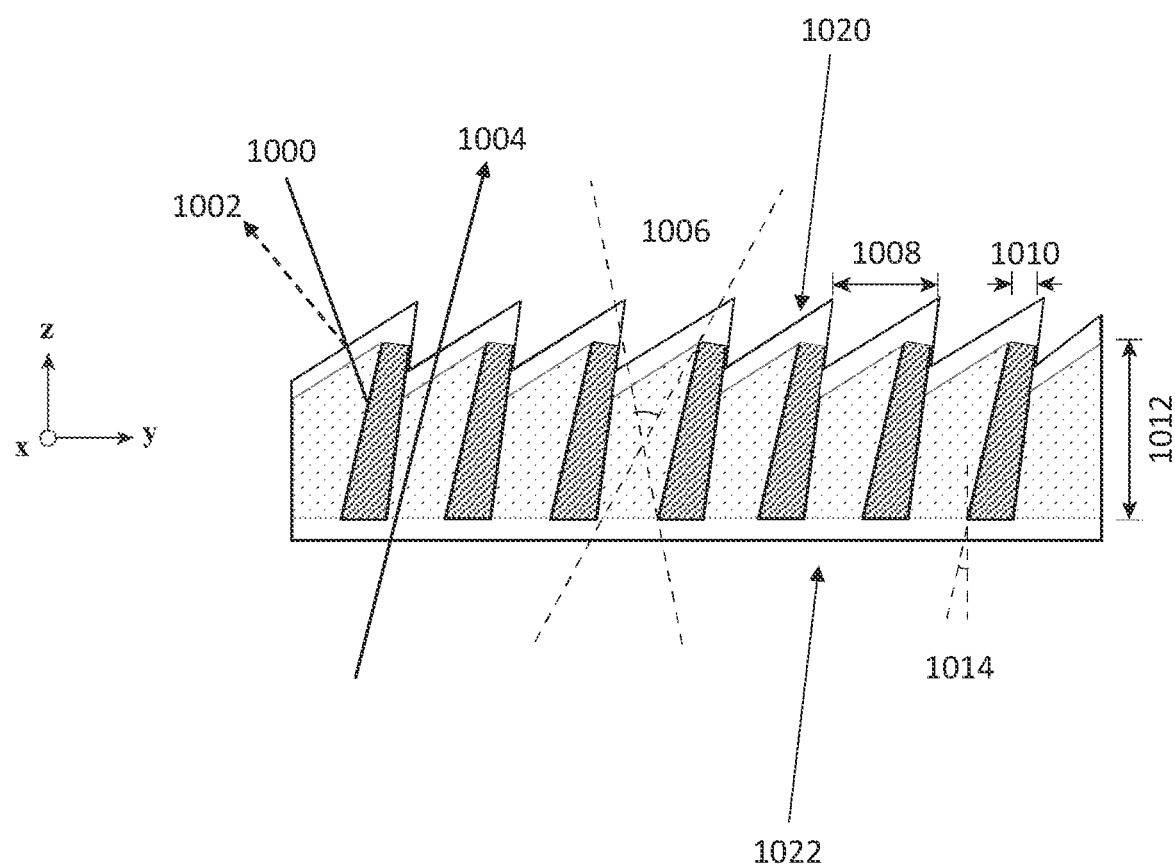
FIG. 10 is a cross section of a light control film in accordance with a third embodiment of the present disclosure.

FIG. 10 shows a light control film 1012 in accordance with yet another embodiment. The light control film 1012 of this embodiment is generally the same as the embodiment of FIG. 9, except that the optically transparent coating layer disposed on the second (top/external) surface, which forms the light receiving surface 1020, does not have a uniform thickness. It should be noted that the angled surfaces formed by the second (top/external) surface of the light control film 1012 between the louvres are illustrated as inclined in the opposite direction (relative to the horizontal or x-y plane) to the corresponding angled surfaces of the light control film 912 of FIG. 9. The skilled person will appreciate that the direction of incline of the angle of the angled surfaces does not affect the operation of the light control film 912, and either direction can be used in all embodiments.

As shown in FIG. 10, the thickness of the coating layer is substantially uniform over the second (top/external) surface of the light control film 1012 over the optically transparent core regions (between the louvres). Thus, as in the embodiment of FIG. 9, the coating does not affect the transmission, by the light control film 1012, of image light from the head-up display through the core material within the range of transmission angles 1006. However, the thickness of the coating layer varies with distance over the louvres of the light control film 1012. In the illustrated configuration, the thickness of the coating over the louvres increases from one side to the other of each louvre in the direction of the array of louvres (illustrated as the y direction). Thus, the serrated configuration of the light receiving surface 1020 has larger and sharper serrations, projections or teeth, as described herein. It may be said that the angle at the corners of the serrations, projections or teeth is varied with distance along the dimension of the serrations. In the illustrated example, the angle at the corner of each serration is reduced from substantially 90° in FIG. 9 to an acute angle of less than 90° in FIG. 10. This alternative configuration of the coating layer allows for customization of the coating and sunlight reflection properties according to application requirements, such as the geometry of the head-up display when in use.

The light control film of the present disclosure prevents a viewer from experiencing glare due to sunlight at the eye-box of a head-up display, for example when the head-up display is used in a vehicle where a pupil expander (or other optical component thereof) may be arranged to receive sunlight. The light control film has angular dependent transmittance due to the geometry of the array of light absorbing louvers, so as to allow transmission of image light from the head-up display to the eye-box at the desired range of angles. For example, the range of transmission angles may allow all the angular channels of the special hologram, as described herein with reference to FIGS. 2 to 4, to reach the eye-box. The pitch, orientation and geometry of the louvres may be configured to avoid the formation of ghost images due to diffraction. In accordance with the present disclosure, the serrated configuration of the surface at the interface between the light control film and air prevents specularly reflected sunlight from reaching the eye-box and causing glare. In particular, the serrated configuration of the light-receiving surface, which in some embodiments is formed by a coating layer, is arranged to deflect sunlight away from the eye-box, whilst ensuring that image light is still propagated to the eye-box so as to provide a full image. In examples, the serrated configuration comprises angled surfaces—which may be angled either way along the dimension of the array of louvres—in order to deflect the sunlight off track to the eye-box. The angle of the angled surfaces may be selected based on the geometry of the head-up display in situ (e.g. location within the vehicle) to prevent specular reflections of sunlight reaching the eye-box. In embodiments in which the serrated light-receiving surface is formed by a coating, the coating may be made of flexible plastics, or other optically transparent material, of materials that provide adequate protective properties, such as thermal, mechanical and fluid resistance characteristics for use in automotive applications, as described herein.

As the skilled person will appreciate, many variations may be made to the embodiments described herein. For example, the array of louvres of the light control film may be arranged in an array have a variable louvre pitch, orientation and geometry, accordingly to application requirements. In addition, whilst the embodiments have serrated light receiving surfaces with angled surfaces between serrations, projections or teeth, in other arrangements, curved surfaces, or surfaces with two or more angled sections may be provided between serrations in order to redirect reflected sunlight away from the eye-box. Thus, whilst the described embodiments include serrations that are aligned with one or more sidewalls of the louvres, the serrations may be coordinated with another periodic position along the dimension of array of louvres.

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In aspects, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display for a vehicle, the head-up display being configured to display images to a viewer having an eye in an eye-box, wherein the head-up display comprises:
   a source of spatially-modulated light;
   an optical waveguide pupil expander having a partially-reflective surface and an opposing reflective surface, the optical waveguide pupil expander being configured to receive spatially-modulated light from the source of spatially-modulated light, guide the spatially-modulated light by reflection between the partially-reflective surface and the opposing reflective surface, and emit a plurality of replicas of the spatially-modulated light from a plurality of emission positions at a first portion of the partially-reflective surface, the optical waveguide pupil expander being arranged, during head-up display operation, in a configuration that is conducive to sunlight glare at one of the surfaces thereof; and
   a light control layer disposed on the optical waveguide pupil expander to receive sunlight on an optical path to the reflective surface, wherein the light control layer comprises a sunlight-receiving surface and a core material separating an array of louvres,
   wherein the sunlight-receiving surface of the light control layer is serrated in coordination with the array of louvres; and
   wherein the array of louvres is configured to transmit spatially-modulated light of the replicas from the first portion of the partially-reflective surface of the optical waveguide pupil expander toward the eye-box, and wherein the serration provides an array of angled surfaces having an angle of orientation configured to direct sunlight received at the sunlight-receiving surface of the light control layer away from the eye-box via specular reflection.

2. The head-up display as claimed in claim 1, wherein a periodicity of the serration of the sunlight-receiving surface is substantially equal to a periodicity of the array of louvres.

3. The head-up display as claimed in claim 2, wherein the array of louvres is a two-dimensional array having a first and second dimension, and the serration is one-dimensional and extends in the first dimension.

4. The head-up display as claimed in claim 1, wherein the louvres are tilted relative to a plane of the light control layer.

5. The head-up display as claimed in claim 1, wherein the louvres are configured to absorb sunlight.

6. The head-up display as claimed in claim 1, wherein the optical waveguide pupil expander is substantially planar.

7. The head-up display as claimed in claim 6, wherein the optical waveguide pupil expander is arranged during head-up display operation in a substantially flat configuration relative to ground.

8. The head-up display as claimed in claim 1, wherein the core material is substantially transmissive to image light of the head-up display.

9. The head-up display as claimed in claim 1, wherein the sunlight-receiving surface is a coating layer that covers the core material and array of louvres.

10. The head-up display as claimed in claim 9, wherein the coating layer is substantially transparent to image light of the head-up display.

11. The head-up display as claimed in claim 9, wherein the coating layer is a cladding layer.

12. The head-up display as claimed in claim 1, wherein the sunlight-receiving surface further comprises an anti-reflection coating.

13. The head-up display as claimed in claim 1, wherein the louvres of the array of louvres are substantially parallel.

14. The head-up display as claimed in claim 1, wherein each louvre of the array of louvres has substantially the same geometry.

15. The head-up display as claimed in claim 1, wherein each louvre of the array of louvres is substantially rectangular or trapezoid in cross-section.

16. The head-up display as claimed in claim 1, further comprising a windshield of a vehicle, configured such that the replicas of the spatially-modulated light are reflected by the windshield to the eye-box.

17. The head-up display as claimed in claim 1, wherein a periodicity of the array of louvres is a uniform periodicity.

* * * * *